United States Patent [19]

Werner et al.

[11] Patent Number: 5,488,073
[45] Date of Patent: Jan. 30, 1996

[54] AZEOTROPIC COMPOSITIONS OF 1,1,1,4,4,4-HEXAFLUOROBUTANE AND N-PENTANE AND THE USE THEREOF IN THE PRODUCTION OF FOAMS

[75] Inventors: Joachim Werner, Bethel Park, Pa.; Scott A. Kane, Wellsburg, W. Va.; Herman P. Doerge, Pittsburgh; Eric F. Boonstra, Oakdale, both of Pa.

[73] Assignee: Bayer Corporation, Pittsburgh, Pa.

[21] Appl. No.: 457,244

[22] Filed: Jun. 1, 1995

Related U.S. Application Data

[62] Division of Ser. No. 410,469, Mar. 24, 1995.

[51] Int. Cl.⁶ .................................................. C08J 9/14
[52] U.S. Cl. .................... 521/131; 521/128; 521/129; 521/174
[58] Field of Search .................... 521/128, 129, 521/131, 174

[56] References Cited

U.S. PATENT DOCUMENTS

| 4,055,507 | 10/1977 | Dastur et al. | 252/162 |
|---|---|---|---|
| 4,076,644 | 2/1978 | Burt et al. | 252/182 |
| 4,898,893 | 2/1990 | Ashida | 521/131 |
| 4,900,365 | 2/1990 | Lund et al. | 134/12 |
| 4,960,804 | 10/1990 | Doerge | 521/130 |
| 5,035,833 | 7/1991 | Ogawa et al. | 252/182.24 |
| 5,096,933 | 3/1992 | Volkert | 521/131 |
| 5,106,527 | 4/1992 | Doerge et al. | 252/172 |
| 5,166,182 | 11/1992 | Blanpied | 521/50 |
| 5,227,088 | 7/1993 | Swan et al. | 252/172 |
| 5,283,003 | 2/1994 | Chen | 252/350 |

FOREIGN PATENT DOCUMENTS

| 1141995 | 6/1989 | Japan . |
|---|---|---|
| 1141996 | 6/1989 | Japan . |

OTHER PUBLICATIONS

Lamberts, 1,1,1,4,4,4–Hexafluorbutane, a New Non–Ozone–Depleting Blowing Agent for Rigid PUR Foams, Polyurethanes World Congress 1991–Sep. 24–26, pp. 734–739.

*Primary Examiner*—Morton Foelak
*Attorney, Agent, or Firm*—Joseph C. Gil; Lyndanne M. Whalen

[57] ABSTRACT

An azeotropic composition made up of from about 73 to about 87% by weight of 1,1,1,4,4,4-hexafluorobutane and from about 13 to about 27% by weight of n-pentane is used as a blowing agent in a process for the production of polyurethane foams.

3 Claims, 1 Drawing Sheet

AZEOTROPIC COMPOSITIONS OF 1,1,1,4,4,4-HEXAFLUOROBUTANE AND N-PENTANE AND THE USE THEREOF IN THE PRODUCTION OF FOAMS

This application is a division of application Ser. No. 08/410,469 filed Mar. 24, 1995.

BACKGROUND OF THE INVENTION

The present invention relates to novel azeotropic compositions, a process for the production of foams in which these azeotropic compositions are used and to foams produced using these azeotropic compositions.

The use of trichloromonofluoromethane (CFC-11) and other chlorofluorocarbons as blowing agents in the production of urethane foams is well known. These CFC blowing agents are also known to have an adverse effect upon the ozone layer in the atmosphere. The urethane foam industry is therefore investigating methods for producing foams with good physical properties without using CFC blowing agents.

Initially, the most promising alternatives appeared to be hydrogen-containing chlorofluorocarbons (HCFCs). U.S. Pat. No. 4,076,644, for example, discloses the use of 1,1-dichloro-2,2,2-trifluoroethane (HCFC-123) and 1,1-dichloro-1-fluoroethane (HCFC-141b) as blowing agents for the production of polyurethane foams. However, HCFCs also have some ozone depletion potential. There is therefore mounting pressure to find substitutes for the HCFCs as well as the CFCs.

Alternative blowing agents which are currently considered promising because they contain no ozone-depleting chlorine are fluorocarbons (FCs) and partially fluorinated hydrocarbons (HFCs). The use of 1,1,1,4,4,4-hexafluorobutane as a blowing agent is disclosed in Lamberts, "1,1,1,4,4,4-hexafluorobutane, a New Non-Ozone-Depleting Blowing Agent for Rigid PUR Foams", *Polyurethanes World Congress* 1991 (Sep. 24–26), pages 734–739.

U.S. Pat. No. 4,898,893 teaches that a blend of a liquid hydrocarbon and halogenated hydrocarbon is useful as a blowing agent for the production of isocyanurate foams.

The use of mixtures of a chlorofluorocarbon having a boiling point between 74° and 120° F. and an alkyl alkanoate having a molecular weight of no more than 88 as a blowing agent for foams is disclosed in U.S. Pat. No. 4,960,804. HCFC-123 and HCFC-141b are among the chlorofluorocarbons disclosed therein.

U.S. Pat. No. 5,035,833 discloses the use of a mixture of dichlorotrifluoroethane and at least one paraffin having 5 or 6 carbon atoms as blowing agents useful for the production of rigid polyurethane foams.

U.S. Pat. No. 5,096,933 discloses a process for the production of rigid polyurethane foams in which cyclopentane and/or cyclohexane and optionally a low boiling compound (i.e., boiling point less than 35° C.) with no more than 4 carbon atoms which is homogeneously miscible in cyclopentane and/or cyclohexane is used.

Azeotropes of HCFCs and various compounds and azeotropes of organic compounds which may be used in combination with HCFCs have also been described in the prior art as being useful blowing agents for the production of foams.

U.S. Pat. No. 4,900,365, for example, teaches that azeotropes of a dichlorotrifluoroethane and isopentane are useful in the production of polyurethane foams.

U.S. Pat. No. 5,106,527 discloses the use of azeotropes of 2-methyl butane and 1,1-dichloro-1-fluoroethane as blowing agents for the production of rigid, closed cell foams.

The azeotropic mixtures taught in U.S. Pat. No. 5,166,182 must have boiling points below 50° C. These azeotropic mixtures are formed from organic compounds having surface active properties that enable the blended azeotropic mixture to become miscible with polymer resins. Examples of the organic compounds described as being useful in the production of such azeotropes include: n-pentane, acetone, methyl alcohol, methyl formate, ethyl formate, ethyl alcohol, 2-methyl butane, nitromethane, cyclopentane, 2,3-dimethyl butane, 2,2-dimethyl butane and dimethyl sulfide. These azeotropes may be used in combination with fluorocarbons but an azeotrope in which a fluorocarbon is one of the components is not taught or suggested.

U.S. Pat. No. 5,227,088 discloses azeotrope-like compositions which are made up of 1-chloro-3,3,3-trifluoropropane and a hydrocarbon containing five or six carbon atoms.

U.S. Pat. No. 5,283,003 discloses a blowing agent which is made up of at least one five-carbon member hydrocarbon, a chlorinated alkane and methyl formate. Methylene chloride is the preferred chlorinated alkane.

Azeotropic mixtures in which HCFCs are included are also known to be useful as cleaning solvents. U.S. Pat. No. 4,055,507, for example, discloses an azeotropic mixture of 1,2-dichloro-1,1-difluoroethane and 3-methylpentane which is taught to be useful as such a solvent. Japanese 1,141,995 discloses an azeotropic mixture of 67 to 87% by weight of HCFC-123 and 13 to 33% by weight of 2-methyl butane which is useful as a cleaning solvent. Japanese 1,141,996 discloses an azeotropic mixture of HCFC-141b and n-pentane or 2-methyl butane or 2,2-dimethyl butane which is also taught to be useful as a cleaning solvent.

The use of azeotropes formed from specified amounts of 1,1,1,4,4,4-hexafluorobutane and n-pentane as a blowing agent or a cleaning solvent has not, however, been described in the prior art.

SUMMARY OF THE INVENTION

It is an object of the present invention to provide novel azeotropic compositions.

It is a further object of the present invention to provide an azeotropic composition which contains no chlorine and therefore has an ozone depletion potential of zero.

It is also an object of the present invention to provide a process for the production of urethane foams in which no chlorine-containing blowing agent is employed.

It is another object of the present invention to provide polyurethane foams having good physical properties, which foams are produced without the use of a chlorine-containing blowing agent.

These and other objects which will be apparent to those skilled in the art are accomplished with the azeotropic compositions of the present invention. These azeotropic compositions are made up of from about 73 to about 87% by weight of 1,1,1,4,4,4-hexafluorobutane and from about 13 to about 27% by weight of n-pentane. These azeotropic compositions are included in a foam-forming mixture which includes an isocyanate and isocyanate-reactive material. The foams made with these azeotropic compositions are characterized by good physical properties.

BRIEF DESCRIPTION OF THE DRAWING

The drawing is a graph showing a plot of the mole fraction of n-pentane in the vapor phase versus the mole fraction of n-pentane in the liquid phase of various mixtures of n-pentane and 1,1,1,4,4,4-hexafluorobutane refluxing at steady state at one atmosphere.

DETAILED DESCRIPTION OF THE INVENTION

Figure 1:
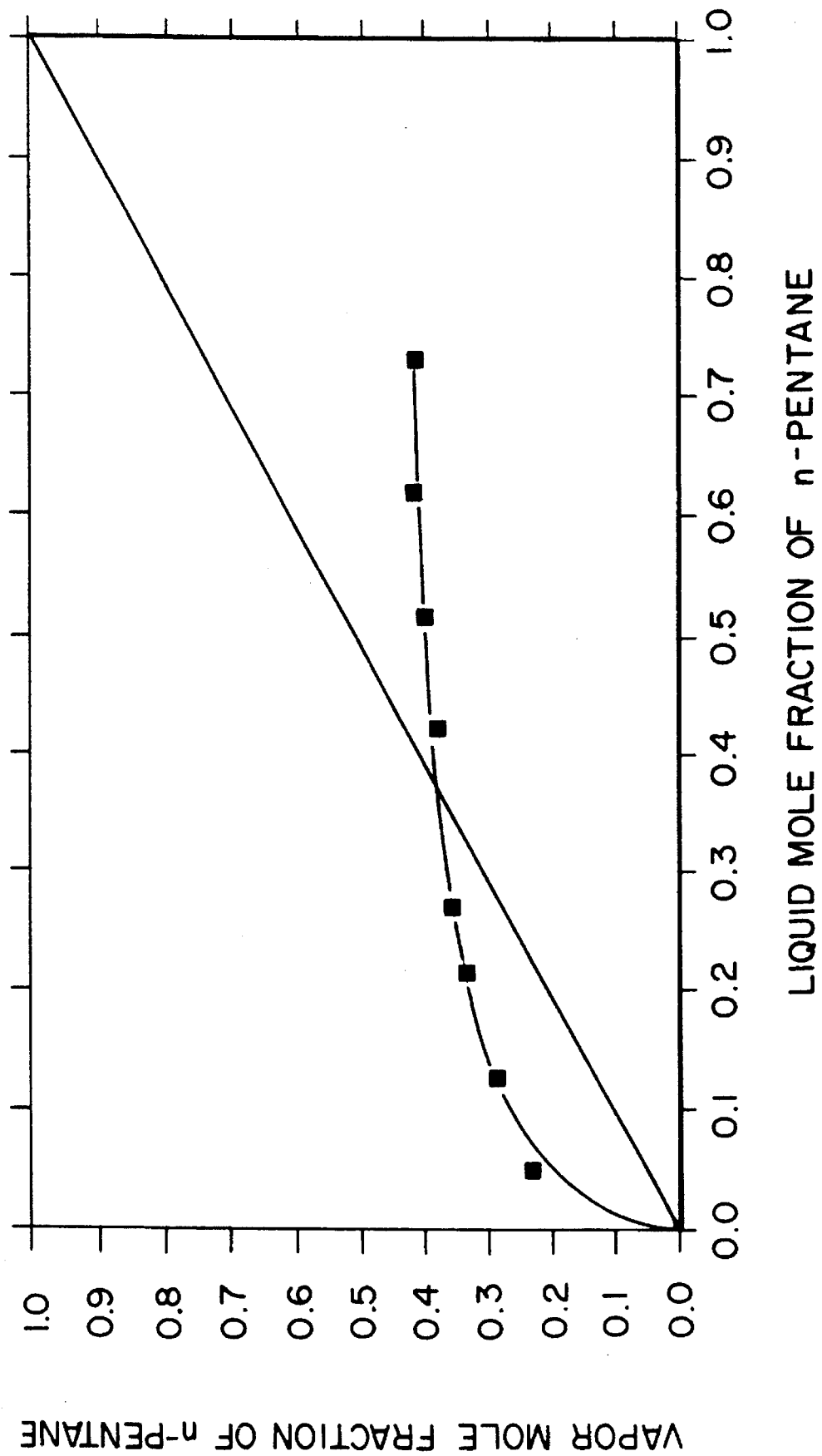

The present invention relates to an azeotropic composition which is particularly useful for the production of rigid foams. This azeotropic composition may also be used for solvent cleaning applications. More particularly, the present invention is directed to azeotrope-like compositions consisting essentially of from about 73 to about 87% by weight of 1,1,1,4,4,4-hexafluorobutane (based on the total weight of the azeotropic composition)(i.e., from about 54 to about 74 mole %) and from about 13 to about 27% by weight of n-pentane (based on the total weight of the azeotropic composition) (i.e., from about 26 to about 46 mole %).

The compounds which are essential to the compositions of the present invention are n-pentane (boiling point=35.5° C.) and 1,1,1,4,4,4-hexafluorobutane (boiling point=24.6° C.). 1,1,1,4,4,4-hexafluorobutane is also known by those skilled in the art as R-356 or HFC-356 mffm. A process for producing 1,1,1,4,4,4-hexafluorobutane is disclosed in U.S. Pat. No. 5,315,047. The n-pentane used in the compositions of the present invention may be of normal commercial purity, i.e., at least 95% n-pentane.

The composition made up of from about 73 to about 87% by weight 1,1,1,4,4,4-hexafluorobutane and from about 13 to about 27% by weight n-pentane is azeotropic in nature in that compositions within these ranges exhibit a substantially constant boiling point. Because they have such a substantially constant boiling point (18.5° C. at one atmosphere), the mixture does not tend to fractionate to any great extent upon evaporation. After evaporation, only a small difference exists between the composition of the vapor phase and the initial liquid phase. This difference is so small that the compositions of the vapor and liquid phases are considered to be substantially identical. Therefore, any mixture within the above-noted ranges exhibits properties which are characteristic of a true binary azeotrope.

The azeotropic compositions consisting essentially of from about 77 to about 84% by weight 1,1,1,4,4,4-hexafluorobutane and from about 16 to about 23% by weight n-pentane are particularly preferred azeotropic compositions. The composition consisting essentially of 80% by weight 1,1,1,4,4,4-hexafluorobutane and 20% by weight n-pentane has been established, within the accuracy of the calibration procedure described below, as the true binary azeotrope with a boiling point of about 18.5° C.

The drawing shows a graph on which the mole fraction of n-pentane in the vapor phase is plotted against the mole fraction of n-pentane in the liquid phase of varying mixtures of n-pentane and 1,1,1,4,4,4-hexafluorobutane refluxing at steady state and at one atmosphere. These mole fractions were obtained by gas chromatography and were adjusted to be quantitative by using a calibration curve as is described more fully below. The point at which the mole fraction curve crosses the line with a slope of 1 and intercept 0 is, by definition, the true binary azeotropic composition.

The calibration curve used to calibrate the gas chromatographic results was generated as follows. A series of blends of n-pentane with 1,1,1,4,4,4-hexafluorobutane was prepared with from 0 to 100 mole percent of n-pentane in 10% increments. The mole percent of 1,1,1,-4,4,4-hexafluorobutane in each blend was the difference between 100 mole percent and the mole percent of n-pentane. First, each blend was injected into a Gas Chromatograph ("GC") to establish a correlation between relative peak areas versus actual molar concentrations. This was done by making duplicate samples of each blend and measuring each sample twice. This data was used to establish the calibration curve and a 95% confidence interval which was used to establish the range of error for the azeotropic compositions.

The relative molar amounts of 1,1,1,4,4,4-hexafluorobutane and n-pentane necessary to form an azeotropic composition were then determined by a two step process. In the first step of this process, n-pentane alone was charged to the reactor. Subsequently, 1,1,1,4,4,4-hexafluorobutane was added to the reactor in increments indicated by the datapoints in the graph. After each addition of 1,1,1,4,4,4-hexafluorobutane, the contents of the reactor were allowed to reflux for 10–15 minutes with the reflux condenser at 0° C. and open to the atmosphere through a drying tube. After steady state was achieved, samples of the liquid and vapor were taken through sample ports. The temperature of the liquid in the reactor was measured and the vapor temperature was measured at a point between the reactor and the condenser. Duplicate samples were injected into the GC and the relative peak areas were recorded. These relative peak areas converted to mole fractions using the calibration curve.

In the second step, 1,1,1,4,4,4-hexafluorobutane was charged to a reactor. Subsequently, n-pentane was added in increments indicated by the datapoints in the graph. The contents of the reactor were then heated and samples were taken and analyzed in the same manner as was done in the first step. The data generated in each of the first and second steps was plotted with the resultant graph being shown in the drawing.

An azeotrope is defined as a mixture of liquids where, at the boiling point, the concentration of the components is the same in the liquid and vapor phases. The point at which the mole fraction plot crosses the line having a slope of 1 and an intercept of 0 is the expected azeotropic composition.

The azeotropic compositions of the present invention are particularly useful as chlorine-free blowing agents for the production of closed cell, rigid foams. Foams made with the azeotropic compositions of the present invention have low densities comparable with those of foams produced with higher amounts of R-356 alone and relatively low K-factors.

Foams may be produced with the azeotropic compositions of the present invention by reacting a) an isocyanate-reactive material with b) an organic polyisocyanate in the presence of one of the azeotropic compositions of the present invention, optionally in the presence of a catalyst and/or other additives and processing aids.

Any of the known organic isocyanates, modified isocyanates or isocyanate-terminated prepolymers made from any of the known organic isocyanates may be used to produce foam from the azeotropic compositions of the present invention. Suitable isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclohexane diisocyanate, hexahydrotoluene diisocyanate and its isomers, isophorone diisocyanate, dicyclohexylmethane diisocyanate, 1,5-naphthalene diisocyanate, 1-methylphenyl-2,4-phenyl diisocyanate, 4,4'-diphenylmethane diisocyanate, 2,4'-diphenylmethane diisocyanate, 4,4'biphenylene diisocyanate, 3,3'-dimethoxy-4,4'-biphenylene diisocyanate and 3,3'-dimethyl-4,4'-biphenylene diisocyanate; triisocyanates such as 2,4,6-toluene triisocyanate; and polyisocyanates such as 4,4'-dimethyldiphenylmethane-2,2',5,5'-tetraisocyanate and the polymethylene polyphenyl polyisocyanates.

Undistilled or crude polyisocyanate may also be used. The crude toluene diisocyanate obtained by phosgenating a mixture of toluene diamines and the diphenylmethane diisocyanate obtained by phosgenating crude diphenylmethanediamine (polymeric MDI) are examples of suitable crude polyisocyanates. Suitable undistilled or crude polyisocyanates are disclosed in U.S. Pat. No. 3,215,652.

Modified isocyanates are obtained by chemical reaction of diisocyanates and/or polyisocyanates. Modified isocyanates useful in the practice of the present invention include isocyanates containing ester groups, urea groups, biuret groups, allophanate groups, carbodiimide groups, isocyanurate groups, uretdione groups and/or urethane groups. Preferred examples of modified isocyanates include prepolymers containing NCO groups and having an NCO content of from about 25 to about 35% by weight, preferably from about 28 to about 32% by weight. Prepolymers based on polyether polyols or polyester polyols and diphenylmethane diisocyanate are particularly preferred. Processes for the production of these prepolymers are known in the art.

The most preferred polyisocyanates for the production of rigid polyurethanes are methylene-bridged polyphenyl polyisocyanates and prepolymers of methylene-bridged polyphenyl polyisocyanates having an average functionality of from about 1.8 to about 3.5 (preferably from about 2.0 to about 3.1) isocyanate moieties per molecule and an NCO content of from about 25 to about 35% by weight, due to their ability to crosslink the polyurethane.

Any of the known isocyanate-reactive compounds may be used to produce foams from the azeotropic compositions of the present invention. Polyether polyols are preferably used to produce rigid foams in accordance with the present invention. Amine-initiated polyether polyols having functionalities of from about 3 to about 4 and molecular weights of at least about 149, preferably from about 149 to about 1500, most preferably from about 300 to about 800 are particularly preferred. These amine-based polyols may be prepared by reacting an amine polyamine or aminoalcohol and optionally other initiators (with or without water) with propylene oxide and optionally, ethylene oxide, in the presence of an alkaline catalyst. The product is then treated with an acid, preferably a hydroxy-carboxylic acid to neutralize the alkaline catalyst. U.S. Pat. No. 2,697,118 discloses a suitable process for the production of such amine-initiated polyols.

Examples of suitable amine initiators include: ammonia, ethylene diamine, diethylene triamine, hexamethylene diamine, amines such as toluene diamine, and aminoalcohols. Aminoalcohols, particularly, monoethanolamine, diethanolamine, and triethanolamine are preferred initiators.

It is preferred that the amine initiator be reacted with propylene oxide, although it may also be reacted with ethylene oxide. If used, the ethylene oxide may be used in an amount of up to 100% by weight of the total alkylene oxide used. The propylene oxide is generally used in an amount of from about 40 to about 100% by weight of the total alkylene oxide employed, preferably from about 60 to about 100% by weight. The total amount of alkylene oxide used is selected so that the product polyol will have an average molecular weight of at least about 149, preferably from about 149 to about 1500.

The amine-based polyether polyol is included in the foam-forming mixture in an amount of from about 20 to about 70% by weight, based on the total foam forming mixture, preferably from about 40 to about 50% by weight.

Other polyether polyols (i.e., polyether polyols which are not based on an amine) known to be useful in the production of rigid polyurethane foams as well as polyester polyols may also be used in the practice of the present invention. Combinations of an amine-initiated polyol and polyols which are not based upon amines are particularly preferred. When such mixtures are used, the amine-initiated polyol is generally included in an amount of at least 20% by weight, preferably from about 50 to about 80% by weight.

When amine-initiated polyol is based upon an aminoalcohol, polyester polyols having functionalities of from about 2 to about 3 (preferably from about 2 to about 2.5) and molecular weights of from about 180 to about 900, preferably from about 300 to about 600 are preferably included in the polyol mixture in an amount of from about 5 to about 50%, most preferably from about 15 to about 35% by weight of the total amount of polyol.

Any of the catalysts known to be useful in the production of rigid polyurethane foams may be employed in the practice of the present invention. Tertiary amine catalysts are particularly preferred. Specific examples of suitable catalysts include: pentamethyl-diethylene triamine, N,N-dimethyl-cyclohexyl amine, N,N',N"-dimethylamino-propyl-hexahydro triazine, tetramethylene diamine, tetramethyl-butylene diamine, and dimethylethanolamine. Pentamethyl-diethylene triamine, N,N',N" -dimethylamino-propyl-hexahydro triazine, and N,N-dimethyl-cyclohexyl amine are particularly preferred.

Materials which may optionally be included in the foam-forming mixtures of the present invention include: chain extenders, crosslinking agents, surfactants, pigments, colorants, fillers, antioxidants, flame retard ants and stabilizers. Carbon black is a preferred additive.

Any of the known methods for producing polyurethane foams may be used in the practice of the present invention. Suitable methods include reaction of the various reactants using the known one-shot process, prepolymer process or semi-prepolymer process.

Having thus described our invention, the following Examples are given as being illustrative thereof. All parts and percentages given in these Examples are parts by weight or percentages by weight, unless otherwise indicated.

EXAMPLES

The following materials were used in the Examples:

POLYOL A: A 630 OH number polyol prepared by reacting 1 mole of ethylene diamine with 5 moles of propylene oxide.

POLYOL B: A 250 OH number polyol prepared by reacting 1 mole of glycerin with approximately 3.3 moles of propylene oxide.

R-356: 1,1,1,4,4,4-hexafluorobutane.

n-Pent: n-pentane.

Tegostab B-8426: A polysiloxane polyether copolymer which is commercially available from Goldschmidt Chemical Corporation.

DMCHA: dimethylcyclohexylamine.

ISO: The polymethylene polyphenyl polyisocyanate prepolymer having an NCO content of approximately 27% which is commercially available from Miles Inc. under the name Mondur E-577.

EXAMPLE 1

19.91 parts of R-356 and 4.98 parts of n-Pent were first mixed. This mixture was then blended with the other components listed in TABLE 1 under B-SIDE. (The materials and the amount of each of those materials included in the B-SIDE are given in TABLE 1.) ISO was then mixed with the B-SIDE (in the amount indicated in TABLE 1) in a mixing vessel using an air driven stirrer. After 5 seconds of mixing, the reaction mixture was poured into a polyethylene-lined cardboard box which measured 10"×10"×2.5". The reactivity time, density and K-factor of the foam produced were determined. The results of these determinations am reported in TABLE 1.

EXAMPLE 2 (COMPARATIVE)

The procedure of Example 1 was repeated using the same materials with the exception that only R-356 was used as the blowing agent. The specific materials, the amount of each material and the characteristics of the product foam are all reported in TABLE 1.

TABLE 1

|  | EXAMPLE 1 | EXAMPLE 2 |
| --- | --- | --- |
| B-SIDE |  |  |
| POLYOL A, pbw | 50.67 | 49.56 |
| POLYOL B, pbw | 50.67 | 49.56 |
| Tegostab B-8426, pbw | 2.24 | 2.20 |
| Water, pbw | 2.24 | 2.20 |
| DMCHA, pbw | 3.70 | 3.26 |
| R-356, pbw | 19.91 | 30.75 |
| n-Pent, pbw | 4.98 | — |
| A-SIDE |  |  |
| ISO, pbw | 165.58 | 162.06 |
| RESULTS |  |  |
| Mix Time, sec. | 5 | 5 |

TABLE 1-continued

|  | EXAMPLE 1 | EXAMPLE 2 |
| --- | --- | --- |
| Cream Time, sec. | <10 | <10 |
| Gel Time, sec. | 46 | 46 |
| Density, lbs/ft$^3$ | 1.86 | 1.82 |
| K-Factor (BTU-in./°F. hr.ft$^2$) | 0.133 | 0.127 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane foam which has been produced by reacting a polyisocyanate with an isocyanate reactive material in the presence of an azeotropic composition consisting essentially of
    a) from about 73 to about 87% by weight of 1,1,1,4,4,4-hexafluorobutane and
    b) from about 13 to about 27% by weight of n-pentane.

2. A polyurethane foam which has been produced by reacting a polyisocyanate with an isocyanate reactive material in the presence of an azeotropic composition of claim 1 consisting essentially of
    a) from about 77 to about 84% by weight of 1,1,1,4,4,4-hexafluorobutane and
    b) from about 16 to about 23% by weight of n-pentane.

3. A polyurethane foam which has been produced by reacting a polyisocyanate with an isocyanate reactive material in the presence of an azeotropic composition of claim 1 consisting essentially of
    a) about 80% by weight of 1,1,1,4,4,4-hexafluorobutane and
    b) about 20% by weight of n-pentane.

* * * * *